US008936677B2

(12) United States Patent
Vazquez Favela et al.

(10) Patent No.: US 8,936,677 B2
(45) Date of Patent: Jan. 20, 2015

(54) METHOD AND INSTALLATION FOR BENEFICIATION OF FLY ASH PARTICLES BY FLASH COMBUSTION

(75) Inventors: Javier Vazquez Favela, Orpund (CH); Maria Claudia Ramirez Carrero, Nuevo Léon (MX); César Alberto Sosa Blanco, Nuevo Léon (MX); Hugo Bolio Arceo, Nuevo Léon (MX)

(73) Assignee: Cemex Research Group AG, Brugg Bei Biel (CH)

( * ) Notice: Subject to any disclaimer, the term of this patent is extended or adjusted under 35 U.S.C. 154(b) by 422 days.

(21) Appl. No.: 13/382,852

(22) PCT Filed: Jul. 8, 2009

(86) PCT No.: PCT/EP2009/004936
§ 371 (c)(1),
(2), (4) Date: Mar. 23, 2012

(87) PCT Pub. No.: WO2011/003428
PCT Pub. Date: Jan. 13, 2011

(65) Prior Publication Data
US 2012/0174825 A1 Jul. 12, 2012

(51) Int. Cl.
C04B 18/08 (2006.01)
F23J 1/00 (2006.01)
F23C 99/00 (2006.01)
C04B 111/10 (2006.01)

(52) U.S. Cl.
CPC . *F23J 1/00* (2013.01); *C04B 18/08* (2013.01); *F23C 99/005* (2013.01);

(Continued)

(58) Field of Classification Search
CPC ........ C04B 18/08; G05B 11/06; G05B 15/00; G05B 13/00; F23J 1/00; F23C 99/005
USPC ................... 106/705, DIG. 1; 700/274, 299.3
See application file for complete search history.

(56) References Cited

U.S. PATENT DOCUMENTS

| 4,419,964 A | | 12/1983 | Enkegaard |
| 5,160,539 A | * | 11/1992 | Cochran ....................... 106/405 |

(Continued)

FOREIGN PATENT DOCUMENTS

EP 0 227 196 A2 7/1987

*Primary Examiner* — Paul Marcantoni
(74) *Attorney, Agent, or Firm* — Arent Fox LLP

(57) ABSTRACT

The invention concerns a method for beneficiation of fly ash particles comprising:
  determining the heat value of the fly ash particles;
  comparing the determined heat value of the fly ash particles with a minimum heat value K;
  feeding an inlet of a combustor (5) with a feed material comprising the fly ash particles and, in case the determined heat value is lower than the minimum heat value K, fuel in sufficient quantity to assure that the heat value of the raw material is greater than or equal to the minimum heat value K;
  supplying an upstream airflow to the combustor (5) so as to carry the feed material in suspension from the inlet to an outlet of the combustor;
  operating the combustor (5) at a temperature of at least 700° C.;
  collecting beneficiated fly ash particles from the airflow at the outlet of the combustor (5).
The invention also concerns an installation for implementation of the said method.

15 Claims, 2 Drawing Sheets

(52) U.S. Cl.
CPC .... *C04B 2111/1087* (2013.01); *F23G 2209/30* (2013.01); *F23J 2900/01007* (2013.01); *F23K 2201/501* (2013.01); *F23K 2203/008* (2013.01); *F23K 2203/104* (2013.01); *F23K 2203/202* (2013.01); *F23N 2021/10* (2013.01); *Y10S 106/01* (2013.01)
USPC ...... 106/705; 106/DIG. 1; 700/274; 700/299; 700/300

(56) References Cited

U.S. PATENT DOCUMENTS

| | | |
|---|---|---|
| 5,399,194 A | 3/1995 | Cochran et al. |
| 6,202,573 B1 | 3/2001 | Bachik |
| 6,755,901 B1 | 6/2004 | Ramme et al. |
| 6,868,368 B1 | 3/2005 | Lang |
| 8,440,015 B1 * | 5/2013 | LaCount et al. ............ 106/705 |
| 2004/0033184 A1 | 2/2004 | Greer |

* cited by examiner

METHOD AND INSTALLATION FOR BENEFICIATION OF FLY ASH PARTICLES BY FLASH COMBUSTION

CROSS-REFERENCE TO RELATED APPLICATIONS

This application is a National Stage entry of International Application No. PCT/EP2009/004936, filed Jul. 8, 2009, the disclosure of the prior application are incorporated in their entirety by reference.

FIELD OF THE INVENTION

The invention generally relates to methods and installations for beneficiation of carbonaceous fly ash.

Fly ash is a by-product derived from the combustion of coal in boiler plants and the like, produced in very large quantities at coal-fired electric utility power plants throughout the world. Pulverised coal is fed to boiler plants where this coal is burned, thereby producing two types of ash: a light finely divided "fly" ash which is carried out in suspension in the gaseous products of combustion and a heavier "bottom" ash which falls to the bottom of the combustor and is removed there from. Fly ash may be separated from the entraining combustion gas stream by an electrostatic precipitator or a mechanical collector plus an electrostatic precipitator in series.

Chemically, fly ash contains a heterogeneous mixture of oxides of iron, silicon, aluminium and calcium and typically 5% or more of carbon. Physically, fly ash is an extremely fine and lightweight particulate material. As an example, more than 95% by weight of fly ash passes a 100-mesh screen and more than 60% by weight passes a 325-mesh screen.

Fly ash can be used for a variety of purposes. Principally, it is used as a substitute or an additive for cement in Portland cement concrete. As a matter of fact, the pozzolanic characteristics of the fly ash qualify it as a substitute for Portland cement in the manufacture of concrete. Some of the advantages attributed to such fly ash as a concrete additive include increased life of the concrete structure, improved flow and pumping characteristics of the concrete, better workability and finishing capability, and decreases in the amount of water required in the concrete mix. Also, substituting Portland cement with fly ash in cement or in concrete reduces the environmental footprint compare to a 100% Portland cement based application since the production of cement releases $CO_2$.

Some fly ashes that can be collected have carbon content (as measured by Loss on Ignition—LOI) of about 0.5 to 4%. These ashes may be sold as acceptable mineral admixture for use in Portland cement concrete under the standards set forth in ASTM C-618-92a, which limits maximum LOI for classes F and C fly ash at 6%.

However, not all fly ashes possess such low carbon content as to pass the standards provided in ASTM C-618. These non-conforming fly ash particles have LOI content greater than 6%, sometimes in the order of 6% to 20% and cannot be used as a substitute for a portion of Portland cement. In fact, the presence of unburned carbon particles in coal combustion fly ash adversely affects the ability of the fly ash to be used as an additive in concrete.

Air is naturally entrapped in concrete through the folding and shearing action of mixing the cement paste during the mixing or concrete batching operation. However, high carbon content fly ash has been shown to cause undesirable reduction in entrained air in concrete because unburned carbon in fly ash has a broad particle size distribution ranging from coarse char (>75 μm) to very fine soot sized (=40 nm) amorphous carbon particles that has a very high surface area (Gao, Y. M., H. S. Shim, et al., "Effects of Carbon on Air Entrainment in Fly Ash Concrete: Role of Soot and Carbon Black", Energy & Fuels 11, 457, 1997). Thus, the durability of concrete to freeze-thaw cycles which dependent on its level of air entrainment is negatively impacted by the presence of unburned carbon. Therefore, the presence of carbon significantly alters the consistency and amount of air entrained in a concrete mix in which fly ash has been used as a substitute for Portland cement.

Furthermore, high carbon content fly ash provides an oily or dark surface appearance on finished concrete surfaces since carbon floats to the surface during finishing and the use of fly ash having high carbon content requires greater water addition and the need for incorporating larger quantities of an air-entraining agent in the concrete.

Moreover, high carbon content fly ash may exhibit reduction in desirable pozzolanic reactivity in some cases.

Thus, it is require processing the raw fly ash to reduce the amount of unburned carbon to the minimum value, even below the levels indicated by regulations or normative bodies.

BACKGROUND OF THE INVENTION

In order to maximize the commercial application of coal combustion fly ash as a component in concrete manufacture, many methods have been developed to remove carbon particles from the fly ash, thereby reducing the drawbacks related to the presence of undesirable amounts of carbon.

Such methods to remove carbon particles typically use means based on froth flotation (see U.S. Pat. No. 6,068,131), particle size distribution U.S. Pat. No. 5,996,808 or electrostatic techniques (see U.S. Pat. No. 5,938,041, JP2004243154A, JP2005279489A). However, although these methods may be appropriate to reduce the carbon content of the beneficiated fly ash in order to meet the specifications for application in cement or concrete, they do not allow reducing the carbon content to such a low value (e.g. less than 2%) to ensure that the concrete systems will not be negatively impacted by the remaining carbon particles. Furthermore, these techniques are quite expensive in term of investment and yield elevated operational costs (energy, pre and post processing).

Various combustion methods to remove carbon from fly ash have been disclosed (U.S. Pat. No. 5,390,611, US 2004231566, US 2006180060). One of the most widely used combustion method is the carbon burn out using fluidised beds (see U.S. Pat. No. 5,399,194, U.S. Pat. No. 5,160,539, US 2008075647, US 2008173217 or WO 2007097745). However, this method presents the following drawbacks. Fluidized beds cannot maintain fluidized conditions without the fine particles being transported. Therefore, such methods require an additional system to capture the small particles on top of the normal collection equipment and there are restrictions regarding the size distribution of the fly ash particle to be beneficiated by such methods so that the number of entrained small particles is limited.

Furthermore, when using a bubbling bed, temperature control of the bubbling bath has the consequence to partially melt the fly ash particles when temperatures are increased too much. A very high residential time at elevated temperature may damage the glassy fly ash particles, resulting in partial sintering or agglomeration, therefore reducing the quality of the final beneficiated product or requiring post processes like further grinding or milling that increase the complexity and the costs of the process. Reducing the bed temperature may circumvent the problem of overheating but limits the burning out of the carbon particles and results in fly ash having still a high LOI. Sometimes, the bed temperatures are controlled using a recirculation loop of beneficiated fly ash particles to avoid that the temperatures increases too much. However, such a recirculation loop increases the technical complexity of the installation. Furthermore, fly ash particles having low heat value are almost impossible to treat with those techniques.

Most of these problems are related to the use of fluidized beds since sintering of the particles due to important and local overheating may occur even at lower overall bed temperature when auto-combustion occurs.

Moreover, GB 1 577 234 discloses a method and an installation for treating fly ash for the production of bricks. Preheated fly ash particles are injected in a combustion chamber wherein an air stream carries them upwardly. The mean residence time of the fly ash particles is approximately 5 seconds. The combustion of the fly ash particles is therefore a rapid combustion. Carbon dust is injected in the combustion chamber as soon as the carbon content of the fly ash particles drops below 3%.

However, the method does not allow assuring the spontaneous combustion of all the carbon present in the fly ash particles. Moreover, the combustor temperature control strategy does not allow avoiding completely overheating of the fly ash and the fly ash particles thus obtained have modified properties and reduced quality. Indeed, the temperature in the combustor is not controlled accurately. As an example, the fly ash feed rate and/or the carbon feed rate are not controlled or used to control the combustor temperature. Furthermore, the energy balance of the system is controlled measuring the temperature outside the combustor, at the discharge duct and it does not assure that some parts of the reactor have a lower temperature causing a carbon content increase in the beneficiated fly ash particles or a higher temperature causing fly ash overheating. Moreover, coarse particles of carbon are settled at the conical bottom of the combustor wherein they start burning causing the problem of increasing the temperature and forming melted particles of fly ash.

Furthermore, the amount of air injected to the combustor is the stoichiometric amount. Therefore, any variation in the carbon content can produce an incomplete combustion, which may generate carbon monoxide. Afterburning equipment is located at the exit of the combustion tube to complete the carbon oxidation to carbon dioxide. However, this afterburning step is dangerous due to the explosive condition of producing carbon monoxide.

SUMMARY OF THE INVENTION

Accordingly, the aim of the invention is to remedy the above-drawbacks by providing a low cost method for beneficiation of fly ash allowing to obtain fly ash particles having less than 1% of loss of ignition without modifying its mineralogical phase.

To achieve theses goals, a first aspect of the invention concerns a method for beneficiation of fly ash particles comprising:
- determining the heat value of the fly ash particles;
- comparing the determined heat value of the fly ash particles with a minimum heat value K;
- feeding an inlet of a combustor with a feed material comprising the fly ash particles and, in case the determined heat value is lower than the minimum heat value K, fuel in sufficient quantity to assure that the heat value of the feed material is greater than or equal to the minimum heat value K;
- supplying an upstream airflow to the combustor so as to carry the feed material in suspension from the inlet to an outlet of the combustor;
- operating the combustor at a temperature of at least 700° C.;
- collecting beneficiated fly ash particles from the airflow at the outlet of the combustor.

Thus, using this method wherein carbon particles are burned in an upward flowing suspension at a temperature of at least 700° C., fly ash particles which are practically free of carbon can be produced without modifying the mineralogical phases, and the particles morphology of fly ash. Moreover, the method is particularly efficient because the heat value of the feed material is adjusted so as to assure the spontaneous combustion of the carbon present in the fly ash particles.

The heat value may be determined using calorimetric techniques or measuring the quantity of carbon present in the raw fly ash. The measurement of either the heat value and/or the sulphur content or both contents may be performed batch wise based on statistic samples or online.

Advantageously, the minimum heat value K is in the range of 600 to 1000 cal/g. Thus, the combustion is complete and overheating of the fly ash is avoided.

Advantageously, the step of determining the heat value comprises measuring the carbon and sulfur contents of the fly ash particles. Therefore, the heat value is accurately determined. Carbon and Sulphur contents may also be measured using loss of ignition techniques or combustion techniques coupled with Infra red analysis that are commercial conventional quality control equipments. Both type of analysis may be used online or based on representative samples.

Advantageously, the fuel is coal.

Preferably, the coal is ground to an average particles size in the range of 50 to 200 microns. Thus, the coal is transported by the airflow with the fly ash particles through the flash combustor.

Average temperature in the combustor is measured and controlled between 700 to 800° C. Thus, a complete carbon combustion reaction proceeds in the combustor without overheating of the fly ash particles.

Advantageously, temperature of the combustor is controlled by regulating the feeding rate of the feed material and/or by regulating the minimum heat value K. Thus, combustor temperature is accurately controlled.

According to a preferred embodiment, average temperature in the combustor is controlled modifying the air flow rate at the combustor entrance, in cases where fly ash particles have a heat value higher than 1300 cal/g. Thus, the temperature is controlled in order to avoid production of sintered fly ash.

Advantageously, the flow rate of the airflow supplied to the combustor is controlled so that the mean residence time of the feed material in the combustor is less than 1 minute. More preferably, the flow rate of the airflow supplied to the combustor is controlled so that the mean residence time of the feed material in the combustor is between about 5 to 15 seconds. Therefore, the combustion reaction is a rapid combustion also called "flash combustion" which is efficient in burning out carbon without overheating of the fly ash particles.

Preferably, the flow rate of the airflow and/or the feeding rate of feed material are controlled such as air is at least 30% in excess of the stoichiometric quantity of air for the oxidation of carbon to carbon dioxide. Therefore, the combustion is complete and does not generate carbon monoxide, which is a highly toxic gas.

The velocity of the airflow through the combustor ranges from 1 meters/second to 3 meters/second so as to assure that fly ash particles are entrained upwardly through the combustor and that fly ash particles dwell for a short period of time in the combustor.

According to a preferred embodiment, the airflow is preheated to a temperature in the range of from 400 to 600° C. before being supplied to the combustor so as to assure autoignition of the carbon particles. Preferably, the airflow is preheated by a heat exchange with airflow outgoing from the combustor, before being supplied to the combustor. Thus, the method has lower energy consumption and therefore has lower operational cost.

Typically fly ash particles have a particle size distribution represented by a d50 in the range of 50 to 200 microns. Thus, most of the fly ash particles are transported by the upstream airflow in due time through the combustor and the amount of material collected at the bottom of the combustor as bottom ash decreases.

According to a second aspect, the invention concerns an installation for beneficiation of fly ash particles comprising:
    a vertical flash combustor comprising means for supplying an upstream airflow so as to carry a feed material in suspension from an inlet to an outlet of the flash combustor;
    a fly ash particles feeding device;
    a fuel feeding device;
    a heat value analyser or a carbon and/or sulphur analyser delivering a signal in relation to the heat value of the fly ash particles;
    a control device for controlling the fly ash particles feeding device and/or the fuel feeding device based on the said signal.

Thus, this installation is suitable for implementing the method according to the first aspect of the invention.

According to a preferred embodiment, the fuel feeding device and the fly ash particles feeding device comprise a weighing device and a screw feeder.

Advantageously, the flash combustor has a internal refractory lining. Thus, the combustor is well insulated and the heat losses are reduced.

In a preferred embodiment, at least five thermocouples are distributed along the flash combustor. Thus, temperatures are measured inside the combustor to assure that the average combustor temperature is accurately determined. Moreover, thermocouples may be used for checking that no part of the combustor reaches an overheating temperature.

Preferably, the installation comprises an airflow preheater system. According to a preferred embodiment, the airflow preheater system comprises a heat exchanger transferring heat from the airflow output from the combustor to the airflow supplied to the combustor.

To sum up, the invention provides a method and an installation for beneficiation of fly ash wherein beneficiated fly ash particles have a very low carbon content and have the high pozzolanic properties of the initial raw fly ash to optimize the use of the beneficiated fly ash in cement or concrete applications. Moreover, the invention provides a highly versatile fly ash beneficiation process that can handle any type of fly ash with limited or no restriction regarding the particle size dimension, the heat value of the raw fly ash or the type of fly ash. The invention provides a method that has very low operation costs compared to the current disclosed systems and an installation wherein no sophisticated recirculation of material is needed.

BRIEF DESCRIPTION OF THE DRAWING

The present invention will now be illustrated, merely by way of example, with reference to the following drawing.

DETAILED DESCRIPTION OF THE INVENTION

Figure 1:
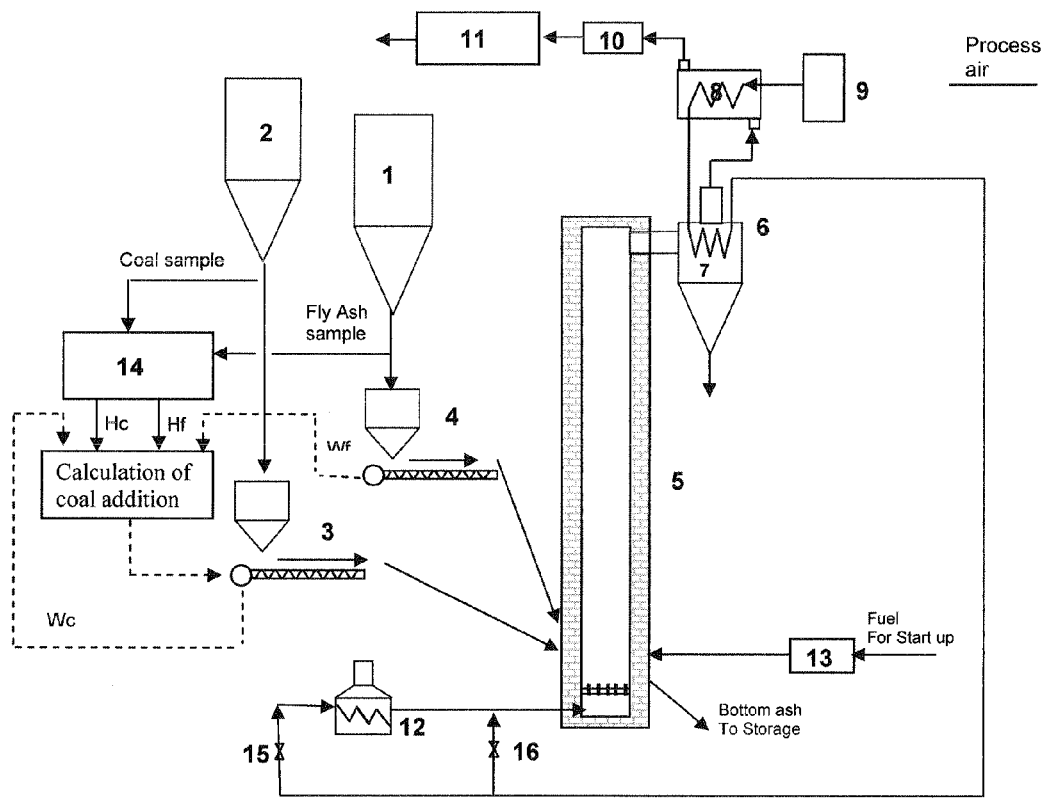
FIG. 1 shows a fly ash beneficiation installation according to a specific embodiment of the invention.

Fly ash particles are transported from a storage yard to a fly ash silo 1, illustrated in FIG. 1, via a conveyor, truck or any other way. Moisture in fly ash is allowed to contents where it can be transported and feed to the combustor 5.

In a non illustrated embodiment, the installation may comprise a fly ash dryer that allows to obtain fly ash particles having preferably a moisture content lower than 5% preferably between 2 to 3%. The fly ash dryer may be a flash dryer, a pallet dryer, a blade dryer or any device that allows mixing fly ash particles with hot air. The fly ash dryer output is connected to a hot cyclone so as to separate the fly ash particles and gases.

Fly ash contains particles of different sizes. The particles size distribution (PSD) of fly ash, which is defined by weight percent of size intervals, is evaluated by screen analysis or any device that performs this analysis. Fly ash particles to be beneficiated are selected and prepared to have a particle size distribution represented by a d50 in the range of 50 to 200 microns, where d50 correspond to a size where 50% by weight of the material is above this value.

Typically, fly ash has a heating value in the range of 160 to 1300 cal/g. According to the invention, a heat value analyser 14 accurately determines the heat value of the fly ash particles. Fly ash particles output from silo 1 are regularly sampled, every hour for example, and the analyser measures the heating value. As an example, the analyser may be a calorimeter LECO AC 500 or equivalent. The analyser 14 delivers a control signal in relation to the heat value of the fly ash particles to a control device.

As an alternative, the heat value analyse may be carried out by measuring the weight difference of a fly ash sample before and after a complete combustion. Moreover, the heat value analyse may also be realized by measuring the carbon and sulfur contents of the samples with a carbon/sulfur combustion analyzer. Based on the above mentioned analysis, the analyser evaluated the fly ash particles heat value with the following formula:

$$HV=0.01*(\% C*7831.1+\% S*2216.88) \text{ kcal/kg}$$

where HV represents the heating value of the fly ash particles; % C represents the percentage by weight of carbon; and % S represents the percentage by weight of sulfur.

Thereafter, the control device compares the heating value of the fly ash particles with a minimum heat value K. In case the fly ash particles have a K value lower than the predefined value K, coal is added to the fly ash particles to assure a minimum heating value of the feed material that will be introduced into a combustor 5.

The analyser can also be used to measure the heat value of the feed material comprising the fly ash and the coal in order to enhance to regulation control of the process.

Coal is stored in a coal silo 2. Advantageously, the coal is previously ground to an average particle size in the range of 50 to 200 microns. The heat value of coal output from the coal silo 2 is also regularly sampled and the analyser 14 measures the heating value Hc of the coal.

Alternatively to adding coal to the feed material, please note that natural gas, rice husk or sugarcane bagasse can also be used as fuel added to the feed material.

Two coal addition control methods will be described below.

The first method is a feed forward strategy were coal is added to assure a minimum heating value in the mixture (K value). The control device calculates the coal addition using the known heating value of coal, the fly ash heating value previously calculated, the fly ash feeding rate from the fly ash feeding device and the K value using the following equation:

$$Fc=Ff*(K-Hf)/(Hc-K),$$

where Fc represents the coal feeding rate, Ff represents the fly ash feeding rate, Hc represents the coal heating value, Hf represents the fly ash heating value and K represents the selected minimum value for the heating value of the raw material.

Of course, when the heating value of the fly ash particles is higher than K, the coal addition is stopped.

Thus, the control device controls a coal feeding device 3 and/or a fly ash particles feeding device 4 to fix the amount of coal and/or fly ash particles fed to the flash combustor 5 so that the feed material has a heating value greater or equal to the minimal heat value K.

Figure 2:
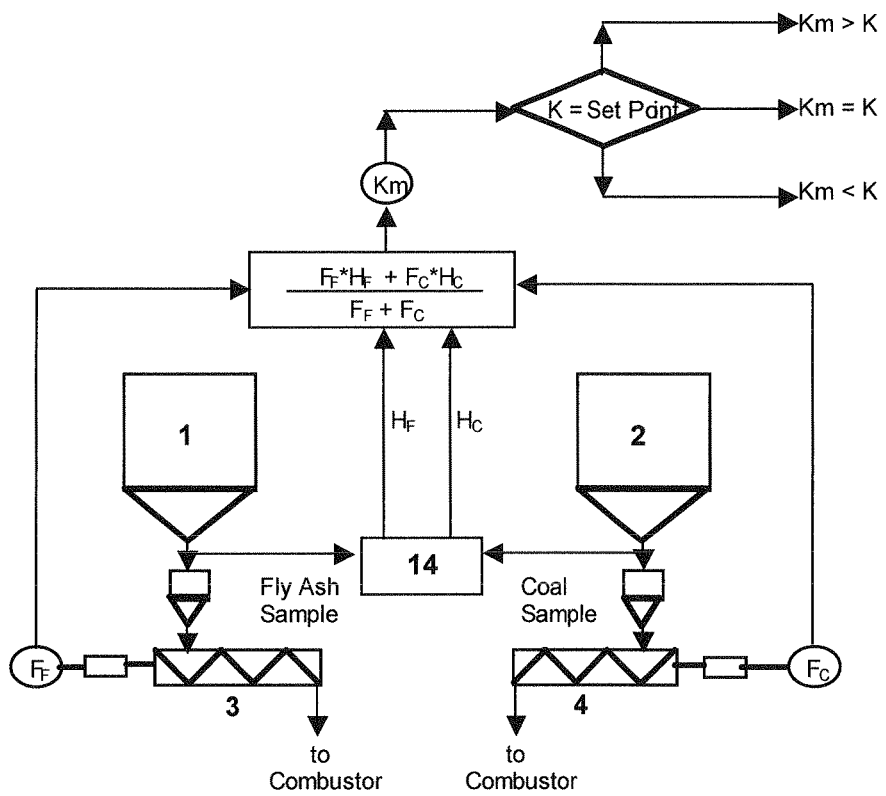
FIG. 2 shows a K value control strategy according to an alternative embodiment of the invention.

The second method is a feedback strategy depicted in FIG. 2. Heat values of the coal and the fly ash particles are measured in a calorimeter or equivalent analyzer 14; mass flow rates are measured by the instruments located in the feeder as weightometers or equivalents instruments. Signals of these variables in the control system are used to calculate the heat value of the entering mixture to the combustor (Km value) as follows:

$$Km=(Fc*Hc+Ff*Hf)/((Fc+Ff)$$

In a feedback loop the control device is a proportional, integral and derivative controller (PID) where the controlled variable is the Km value. The set point of this variable correspond to the minimum K value and the manipulated variable is coal feed rate. The tuning procedure of the control loop to define how the manipulated variable must change when the calculated Km is different from the K value is very well known. When Km is lower than K, the coal feeding rate Fc is increased and when Km is higher than K, the coal feeding rate Fc is decreased.

To assure the spontaneous combustion of the carbon present in the fly ash and the coal, the feeding material has a minimum heating value K in the range of 600 to 1,000 cal/g. More preferably, the minimal heat value K is in the range of 800 to 1000 cal/g. These values were obtained by experimentations at laboratory scale wherein different mixtures of fly ash and coal were burned. Results showed that the combustion is complete when temperature combustor was 700° C. and a mixture of coal and fly ash with a heating value of 600 cal/g was burned. It was also observed that when K value is increased to values of 1000 cal/g, temperatures in the combustor are around 900° C. Therefore, in order to not damage the fly ash particles, the minimum heating value K must be equal or lower than 1000 cal/g. With this experimentation K value should be previously defined. This condition is necessary to assure the spontaneous combustion of the carbon present in the fly ash and the coal.

In the illustrated embodiment, the installation comprises a coal feeding device 3 and a fly ash particles feeding device 4 that feed independently an inlet of the flash combustor 5. In another, non-illustrated, embodiment, fly ash particles and coal are previously mixed in a mixer before being fed to the combustor 5. Each one of these feeding systems 3, 4 have a weighing system to control the feed rate and give information to the control device of the amount of feed material entering the flash combustor 5 per hour. The feeding devices 3, 4 can be screw feeders or any other device having a variable speed motor to control the feed rates. Thus, the control device can control the feeding rate by adjusting the speed of the feeding devices 3, 4.

The installation also comprises a combustor 5. According to the invention, the combustor is a flash combustor 5 comprising a vertical chamber in which air and the feed material combust in an upward flowing suspension. A flash combustor provides a rapid heat treatment designated as "flash combustion" with duration of the order of a few seconds to a few tens of seconds.

The flash combustor 5 has at least an inlet for feeding the fed material comprising fly ash particles and, in case the heat value of the fly ash particles is lower than K, coal in sufficient quantity as explained above. At the inlet, an injector, non illustrated, introduced fly ash particles and coal into the combustor 5.

The flash combustor 5 has a burner 13. The burner 13 is operated with any combustion agent and air and is used during the start up of the installation. The operation of the flash combustor 5 begins when airflow is injected and, the burner 13 is started to heat the body of the flash combustor 5. When the average temperature at the combustor 5 is in the range of 700 to 800° C., the fly ash feeding device 4 and eventually the coal feeding device 3 are started and the burner 13 is turned off. The fly ash combustion continues without adding energy in the burner 13.

The flash combustor 5 comprises thermocouples distributed along the chamber and connected to a control temperature device to control the temperature operation in the chamber between 700 and 850° C. Advantageously, there is at least three thermocouples distributed along the combustor and more preferably, there is at least five thermocouples.

The average operating temperature in the flash combustor 5 should be comprised between 700 to 800° C. Therefore, the control temperature device regulates the average operating temperatures by adjusting the feeding rates and/or the flow rate and the temperature of the upstream airflow and/or the minimum heat value K so as to keep the average temperature in the combustor in the above-mentioned range. Moreover, to avoid agglomeration and sinterisation of the fly ash particles in the body of the combustor 5, all the temperatures measured by thermocouples must not exceed 900° C. Therefore, in the case of reaching a temperature above 900° C., the temperature control device should stop carbon addition, and if this condition persists, reduce the fly ash feeding rate.

According to an embodiment of the invention, air flow rate in combustor entrance is modified to control the combustion temperature in cases where fly ash particles has a calorific power higher than 1300 cal/g.

According to an embodiment of the invention, a heat exchanger may also be placed in the flash combustor 5 to control the combustion temperature in cases where fly ash particles has a calorific power higher than 1300 cal/g. The cooling fluid can be air or any fluid that transport the energy out of the reactor to be recovered as steam.

The installation also comprises means for supplying an upstream airflow so as to carry the feed material in suspension from the inlet to an outlet of the flash combustor 5. Means for supplying the airflow comprises a forced draft blower 9. Moreover, the installation comprises an airflow preheater system. Thus, the upstream airflow is heated so that the temperature of the air is in the range of 400 to 600° C. to assure the auto ignition of carbon particles of the feed material.

Airflow rate control is performed connecting an airflow measurement device and a controller connected to a valve (not shown) located at the process air supply line before entering the heat exchanger 8.

In the illustrated embodiment, the airflow preheater system comprises an air preheater 12 and two energy recovering system 7, 8. The first heat exchanger 7 is located inside the cyclone 6 wherein fly ash particles are collected from the airflow outgoing from the flash combustor 5 and the second heat exchanger 8 is located in the overflow line of the said cyclone 6. The airflow preheater system also comprises an airflow temperature control device and a thermocouple located in the airflow inlet of the flash combustor 5 connected to the said airflow temperature control device so as to keep the airflow inlet temperature between 400 to 600° C. When temperature of the airflow entering the combustor is lower than the limit for auto ignition of the carbon particles, preheater 12 is turned on and its input valve 15 is opened to increase the air temperature between 400 to 600° C.

The airflow rate is set to have a velocity of air in the range of 1.0 to 3.0 m/s in the flash combustor 5 and a mean residence time of particles in the combustor 5 in the range of 10 to 20 seconds. Of course, the airflow rate is determined in relation with the flash combustor dimensions, which are typically in the range of 10 to 25 m (height) and 1 to 3 m (diameter).

Moreover, in order to assure the total combustion of carbon in the combustor, airflow rate must be at least 30% in excess of the necessary stoichiometric quantity of air for the oxidation of carbon to carbon dioxide. In this condition carbon monoxide is not produced and afterburning equipment is not necessary in the combustor output to complete the oxidation reaction. Therefore, the flow rate of airflow and/or the feeding rates of the feed material are adjusted accordingly.

Air flow rate to achieve a 30% in excess of stoichiometric air is calculated with the following methods:
a) When the heat value HV of the feed material is measured and/or may be calculated, the carbon analysis can be estimated considering the carbon as the major contributor to the HV in the mixture and it is calculated with the formula: % C=HV*100/7831.1
Once the carbon percent is calculated the air flow rate in $Nm^3/h$ is calculated by the following formula AF=126.12*mtph*% C
b) When carbon and sulfur are measured in the mixture, the air flowrate in $Nm^3/h$ is calculated by the equation AF=1513.47*mtph*(% C/12+% S/32)
where AF=Air flowrate $Nm^3/h$ and mtph=Tons of feeding material per hour.

Advantageously, the flash combustor 5 is well insulated to reduce the heat loss by placing refractory lining in the inner surface of the combustor 5.

The feed material is fed at the inlet of the combustor 5, situated near the bottom of the chamber. In the flash combustor 5, the feed material gets into contact with the upstream airflow that is injected in the bottom of the flash combustor 5. Feed material particles are transported through the flash combustor 5 and get into contact with other particles where the combustion is in progress, this allows new entering particles to start the combustion.

At the outlet of the flash combustor 5, fumes containing the materials after passage through the chamber are conducted to at least one hot cyclone 6 wherein fly ash particles are collected from the airflow. Fly ash particles move to the underflow orifice and leave the cyclone 6. Thereafter, the beneficiated fly ash is transported to a cooler and lastly to a final silo. According to the invention, the beneficiated fly ash particles thus obtained contains less than 1% of carbon.

Very fine particles and gases are reported to the overflow, in the overflow exit of the hot cyclone 6. The heat exchanger 8 located in the overflow line of the said cyclone preheats the process airflow recovering energy from hot flue gases. Furthermore, process airflow temperature is further increased by recovering heat from heat exchanger 7 located in the hot body of the cyclone 6. Thereafter, hot airflow leaving the heat exchanger 7 is used to feed the flash combustor.

Exhausted gases leaving the heat exchanger 8 are filtered in a filter 10 that can be an electrostatic filter or any other device that clean the gases of fine particles before they pass through the induced draft fan 11.

Fly ash and coal of the feed material contains particles of different sizes, coarse particles, which are not transported by the airflow in the flash combustor 5, tends to settle down at the bottom of the combustor 5. This material represents approximately 10% of the feed material by weight and it is necessary to install an output line located at the bottom of the combustor to collect this material as bottom ash.

EXAMPLES

Tests were performed with two fly ashes one with a high heating value of 1324 cal/g and another with a low heating value of 168 cal/g. Properties of both fly ashes and coal are presented in table 1. The experimentation was conduced at pilot plant level in a combustor of 15 meters of height and 0.5 meters of diameter.

Table 2. shows the operating conditions for the two examples.

In the example 1 the heating value was higher than 1000 cal/g, thus the operating conditions were established to keep an energy produced in the reactor of 0.32 MM Btu/h and an average temperature of the reactor of 750° C., this was accomplished with a high air flow rate, 325 NCMH (Normal Cubic Meter Per Hour), and a low fly ash feed rate 70 kg/h. The product of this experiment was a beneficiated fly ash with 0.6% of LOI and 72.7% of the material was recovered as beneficiated fly ash.

In the example 2 the heating value of the fly ash was lower to keep the self combustion of the fly ash in the reactor. As heat value of the fly ash particles was lower than 600 cal/g, coal was added to form a feed material having 10% of Coal and 90% of fly ash and a heating value of 690 cal/g. This material was processed in the reactor with an average temperature of 708° C. and with a capacity of 108 kg/h of fly ash. Results showed a beneficiated fly ash having 0.20% of LOI and 81.9% of the feed material was recovered as beneficiated fly ash.

During the experimentation in both tests, temperatures of the five thermocouples were lower than 900° C. and no sintered nor agglomerated material were produced. Bottom ash was produced in both tests as 8.1 and 9% from the initial feed material in examples 1 and 2 with LOI of 20.0 and 2.96 respectively.

In the laboratory, during the combustion experiments with various ratios coal and fly ash, it was observed than mixtures prepared to have a HV value lower than 600 cal/g would yield a carbon to CO2 conversion (carbon combustion in the mixture) in the range 41% to 60% whereas increasing the coal in the mixture to reach values higher than 600 cal/g will enable a conversion factor of above 95%,

TABLE 1

Properties of materials in examples 1 and 2.

| Material Property | Example 1 | Example 2 |
|---|---|---|
| Fly ash particle size, microns | 63 | 54 |
| Fly ash LOI, % | 20.00 | 2.96 |
| Fly ash heating value, kcal/kg | 1324 | 168 |
| Coal Particle size, microns | — | 54 |
| Coal Heating value, kcal/kg | — | 4682 |
| Mixture Feed, LOI % | 20 | 7.45 |
| Heating value of mixture, kcal/kg | 1324 | 690 |

TABLE 2

Process variables and results.

| Process variables | Example 1 | Example 2 |
|---|---|---|
| Average Temperature in the combustor, ° C. | 750 | 708 |
| Average air velocity of the upstream airflow, m/s | 1.8 | 1.2 |
| Average residence time of the fly ash particles, s | 7.98 | 12.12 |
| Combustor air feed temperature, ° C. | 476 | 450 |
| Air in excess, % | 157 | 149 |
| Total air flow rate input, NCMH | 325 | 222 |
| Air to combustor, NCMH | 300 | 202 |
| Air to transport bottom ash, NCMH | 25 | 20 |
| Fly ash feed rate, kg/h | 70 | 108 |
| Coal feed rate, kg/h | 0 | 12 |
| % Coal in mixture | 0 | 10 |
| Bottom ash flow rate, kg/h | 5.66 | 10.92 |
| Fly ash product rate, kg/h | 50.92 | 98.273 |
| Product LOI, % | 0.6 | 0.2 |

The invention claimed is:

1. A method for beneficiation of fly ash particles, the method comprising:
   determining the heat value of the fly ash particles;
   comparing the heat value of the fly ash particles with a minimum heat value K;
   feeding an inlet of a combustor with a feed material comprising the fly ash particles and, in case the heat value is lower than the minimum heat value K, fuel in sufficient quantity to assure that the heat value of the feed material is greater than or equal to the minimum heat value K;
   supplying an upstream airflow to the combustor so as to carry the feed material in suspension from the inlet to an outlet of the combustor;
   operating the combustor at a temperature of at least 700° C.; and
   collecting beneficiated fly ash particles from the airflow at the outlet of the combustor.

2. A method for beneficiation of fly ash particles according claim 1, wherein the minimum heat value K is in the range of 600 to 1000 cal/g.

3. A method for beneficiation of fly ash particles according to claim 1, wherein the step of determining the heat value comprises measuring the carbon and sulfur contents of the fly ash particles.

4. A method for beneficiation of fly ash particles according to claim 1, wherein the fuel is coal.

5. A method for beneficiation of fly ash particles according to claim 4, wherein the coal is ground to an average particles size in the range of 50 to 200 μm.

6. A method for beneficiation of fly ash particles according to claim 1, wherein average temperature in the combustor is measured and controlled to between 700 to 800° C.

7. A method for beneficiation of fly ash particles according to claim 6, wherein temperature of the combustor is controlled by regulating the feeding rate of the feed material and/or by regulating the minimum heat value K.

8. A method for beneficiation of fly ash particles according to claim 1, wherein average temperature in the combustor is controlled modifying the flow rate of the airflow supplied to the combustor in cases where fly ash particles have a heat value higher than 1300 cal/g.

9. A method for beneficiation of fly ash particles according to claim 1, wherein the flow rate of the airflow supplied to the combustor is controlled so that the mean residence time of the feed material in the combustor is less than 1 minute.

10. A method for beneficiation of fly ash particles according to claim 9, wherein the flow rate of the airflow supplied to the combustor is controlled so that the mean residence time of the feed material in the combustor is between about 5 to 15 seconds.

11. A method for beneficiation of fly ash particles according to claim 1, wherein the flow rate of the airflow and/or the feeding rate of feed material are controlled such as air is at least 30% in excess of the stoichiometric quantity of air for the oxidation of carbon to carbon dioxide.

12. A method for beneficiation of fly ash particles according to claim 1, wherein the velocity of the airflow through the combustor ranges from 1 meters/second to 3 meters/second.

13. A method for beneficiation of fly ash particles according to claim 1, wherein the airflow is preheated to a temperature in the range of from 400 to 600° C. before being supplied to the combustor.

14. A method for beneficiation of fly ash particles according to claim 13, wherein the airflow is preheated by an heat exchange with airflow outgoing from the combustor, before being supplied to the combustor.

15. A method for beneficiation of fly ash particles according to claim 1, wherein fly ash particles are selected and prepared to have a particle size distribution represented by a d50 in the range of 50 to 200 microns.

* * * * *